(12) United States Patent
Tsutsumi

(10) Patent No.: US 6,473,842 B1
(45) Date of Patent: Oct. 29, 2002

(54) VIRTUAL MEMORY MANAGING SYSTEM FOR MANAGING SWAP-OUTS BY PAGE UNITS AND A BATCH SWAP-OUT BY TASK UNITS

(75) Inventor: Yasunori Tsutsumi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/477,359

(22) Filed: Jan. 4, 2000

(30) Foreign Application Priority Data

Jan. 4, 1999 (JP) .......................................... 11-000103

(51) Int. Cl.$^7$ .............................................. G06F 12/12
(52) U.S. Cl. ........................ 711/159; 711/160; 711/203
(58) Field of Search ................................ 711/203, 206, 711/208, 209, 207, 160, 159

(56) References Cited

U.S. PATENT DOCUMENTS

| | | | | |
|---|---|---|---|---|
| 4,638,426 A | * | 1/1987 | Chang et al. ................ | 711/207 |
| 5,367,705 A | * | 11/1994 | Sites et al. ................... | 711/140 |
| 5,465,337 A | * | 11/1995 | Kong .......................... | 711/206 |
| 5,493,663 A | * | 2/1996 | Parikh ......................... | 711/159 |
| 5,586,283 A | * | 12/1996 | Lopez-Aguado et al. ... | 711/206 |
| 5,835,961 A | * | 11/1998 | Harvey et al. ............... | 711/206 |
| 6,247,042 B1 | * | 6/2001 | Engstrom et al. ........... | 709/107 |
| 6,289,432 B1 | * | 9/2001 | Ault et al. ................... | 711/147 |

FOREIGN PATENT DOCUMENTS

| | | |
|---|---|---|
| JP | 52-132740 | 7/1977 |
| JP | 59-5480 | 1/1984 |
| JP | 61-2982 | 1/1986 |
| JP | 1-94457 | 4/1989 |
| JP | 3-25645 | 2/1991 |
| JP | 3-174637 | 7/1991 |
| JP | 6-89221 | 3/1994 |

\* cited by examiner

*Primary Examiner*—Hong Kim
(74) *Attorney, Agent, or Firm*—Foley & Lardner

(57) ABSTRACT

The virtual memory managing system of the present invention includes a virtual memory managing unit that manages a virtual memory system by combining swap-out in page units and swap-out in task units. The virtual memory managing unit includes: a memory area reserving unit that creates and manages swap management tables corresponding to a memory area reserve requests from tasks and reserves memory areas for the memory area reserve requests; a swap-out control unit that, when swap-out becomes necessary, determines whether swap-out should be carried out in page units or batch swap-out should be carried out in task units, and based on this determination, controls swap-out and sets information in the swap management tables; and a swap-out object limiting means that, when batch swap-out is to be carried out in task units, carries out a limited swap-out based on the swap management tables.

7 Claims, 4 Drawing Sheets

VIRTUAL MEMORY MANAGING SYSTEM FOR MANAGING SWAP-OUTS BY PAGE UNITS AND A BATCH SWAP-OUT BY TASK UNITS

BACKGROUND OF THE INVENTION

1. Field of the Invention

The present invention relates to a virtual memory managing system for managing swap-out/swap-in relating to physical memory areas in a main storage device, segments in virtual memory space, and swap files in an auxiliary storage device in a virtual memory system.

2. Description of the Related Art

When swap-out became necessary in a virtual memory system, virtual memory managing systems of this type of the prior art carried out swap-out in page units. (Physical storage areas in a main memory device, segments in virtual memory space, and swap files in an auxiliary storage device are hereinbelow referred to as "memory areas.")

When carrying out swap-out by page units in a virtual memory managing system of the prior art, a method is commonly adopted in which swap-out is performed by, for example, an algorithm that takes the page in use as LRU (Least Recently Used) to effectively carry out swap-out and swap-in of pages.

A virtual memory managing system of the prior art as described above, however, has the following problems.

First, because swap-out is carried out in page units by an algorithm such as LRU, swap-out of a page is carried out for the first time after page data (data within a page) have gone unused for a long time and have become old. The problem, therefore, is the existence of a certain amount of hold time until a page that actually is no longer used in tasks is swapped out. In other words, there was a problem of inefficient use of time in the memory management in a virtual memory system.

A second problem is that swap-out was carried in page units even when a task required that a memory area of large capacity be reserved, and swap-out of pages therefore had to be carried out repeatedly to reserve the necessary memory area. In other words, there was a problem of inefficient use of space in the memory management in the virtual memory system.

SUMMARY OF THE INVENTION

In view of the above-described problems, it is an object of the present invention to provide a virtual memory management system that enables memory management that is efficient in terms of both time and space in a virtual memory system through a "combination of swap-out in page units and swap-out in task units."

Patent Gazette publications relating to the prior art of this invention include Japanese Patent Laid-open No. 25645/91, Japanese Patent Laid-open No. 174637/91, and Japanese Patent Laid-open No. 89221/94.

Japanese Patent Laid-open No. 25645/91 (Virtual Space Swapping System) relates to a technique in an information processing system that includes multiple virtual space and that manages this virtual space by segments and pages (pages being subdivided segments), the number of referenced pages (pages referenced in the relevant segment) being counted by segment, and swap-in being carried out while giving priority to segments having a large number of referenced pages so as to limit the total number of swapped-in pages. Although this technique shares with the present invention the object of providing efficient control of swap-out/swap-in, it differs entirely in terms of both viewpoint and constitution because it seeks to improve the swapping efficiency by reducing the number of swapped-in pages based on the count of referenced pages, in contrast to the present invention, which seeks to improve efficiency of swapping through "the combination of swap-out by page units and swap-out by task units."

The technique of Japanese Patent Laid-open No. 174637/91 (Virtual Storage Control Method and Device) enables the reuse of used areas of a page when swapping out by preventing the erasing of these pages that are once recorded in an auxiliary storage device when swapping-in. This technique also shares with the present invention the object of efficient control of swap-out/swap-in. However, when swapping out, this technique determines whether or not areas of an auxiliary memory device can be reused and then determines whether areas are to be reused or newly reserved, and this technique therefore differs in terms of both viewpoint and constitution from the present invention, which seeks to improve efficiency of swapping out through "the combination of swap-out by page units and swap-out by task units." In addition, when there is a request from a task to reserve memory areas, the present invention reserves areas within an auxiliary storage device (swap files) and at the same time reserves physical memory areas on a one-to-one basis, and the present invention therefore dues not require determination of whether or not areas of an auxiliary storage device are to be reused, as in the above-described art in the patent gazette.

Finally, Japanese Patent Laid-open No. 89221/94 (Computer System Memory Managing Method and Device) carries out judgments based on history information that has been made a vector (information recorded in a swap vector) when selecting pages that are to be paged out. Although this technique shares with the present invention the objective of efficient control of swap-out/swap-in, this technique seeks this improved efficiency through appropriate selection of pages that are to be paged out and therefore differs entirely in both viewpoint and constitution from the present invention, which seeks to improve efficiency of swapping through the "combination of swap-out in page units and swap-out in task units."

Each of the above-described cases of the prior art has an entirely different constitution from the present invention as described hereinabove, and it goes without saying that even a combination of these cases of the prior art would not arrive at the technical idea of the present invention.

The virtual memory managing system of the present invention includes in a virtual memory system:

swap management tables provided with the items: page tag, update bit, and copy bit for each page;

memory area reserving means for, based on a memory area reserve request from a task, producing and managing the swap management table that corresponds to that memory area reserve request;

reserving, for that memory area reserve request, physical memory areas in a main storage device, segments in virtual memory space, and swap files in an auxiliary storage device;

and setting information in the swap management tables by means of the reservation of these memory areas;

swap-out control means for, when swap-out becomes necessary, determining whether swap-out should be carried out in page units or batch swap-out should be carried out in task units;

controlling and executing swap-out based on this determination;

and setting information indicating that pages that are subject to swap-out have been copied to swap files in the auxiliary storage device in copy bits for these pages in the swap management tables;

memory writing managing means for, when data within the pages have been updated, setting information indicating update of these pages in update bits for these pages in the swap management tables; and swap-out object limiting means for effecting control such that, when batch swap-out is carried out in task units under the control of the swap-out control means, swap-out is not carried out for "pages that have been copied without being updated" based on update bits and copy bits in the swap management tables.

In more general terms, the virtual memory managing system of the present invention can be described as a construction in a virtual memory system having: a memory area reserving means for, based on a memory area reserve request from a task, reserving physical memory areas of a main storage device, segments in virtual memory space, and swap files in an auxiliary storage device; and swap-out control means for, when swap-out becomes necessary, determining whether swap-out should be carried out in page units or batch swap-out should be carried out in task units (for example, a determination to carry out swap-out in task units if the memory size of memory areas that are the requested object of the memory area reserve request that has brought about swap-out is greater than a reference value), and controlling and executing swap-out based on this determination (for example, control for selecting pages to be subjected to swap-out by an algorithm such as LRU if it has been determined that swap-out should be carried out in page units, and control for selecting the task to be subjected to swap-out by an algorithm such as averaged LRU for the group of used pages if it has been determined that swap-out should be carried out in task units).

Further, the virtual memory managing system of the present invention can be realized as a record medium on which is recorded a program for causing a computer in a virtual memory system to function as a memory area reserving means that, based on a memory area reserve request from a task, reserves physical memory areas in a main storage device, segments in virtual memory space, and swap files in an auxiliary storage device; and a program for causing the computer to function as the swap-out control means that, when swap-out becomes necessary, determines whether swap-out should be carried out in page units or batch swap-out should be carried out in task units, and then controls and executes swap-out based on this determination.

As explained hereinabove, the present invention has the following merits:

As a first merit, the present invention can efficiently carry out the reserving and management of memory areas used in a task in a virtual memory system.

This effect is obtained because the present invention can effect memory area reserving and management that is efficient in terms of both time and space by appropriately combining swap-out in page units with swap-out in task units and enabling control in which batch swap-out is carried out in task units without swapping page by page when it is determined that a memory area having a large memory size is required all at once.

As the second merit, the present invention enables still greater efficiency of swapping-out when carrying out batch swap-out in task units that offers the above-described merit.

This merit is obtained because control is effected when carrying out batch swap-out in task units such that swap-out is carried out only for pages other than pages that have already been swapped out (pages that do not require swap-out), thereby allowing a lightening of the swap-out load.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

The present invention is next explained in detail with reference to the accompanying figures.

First Embodiment

Figure 1:
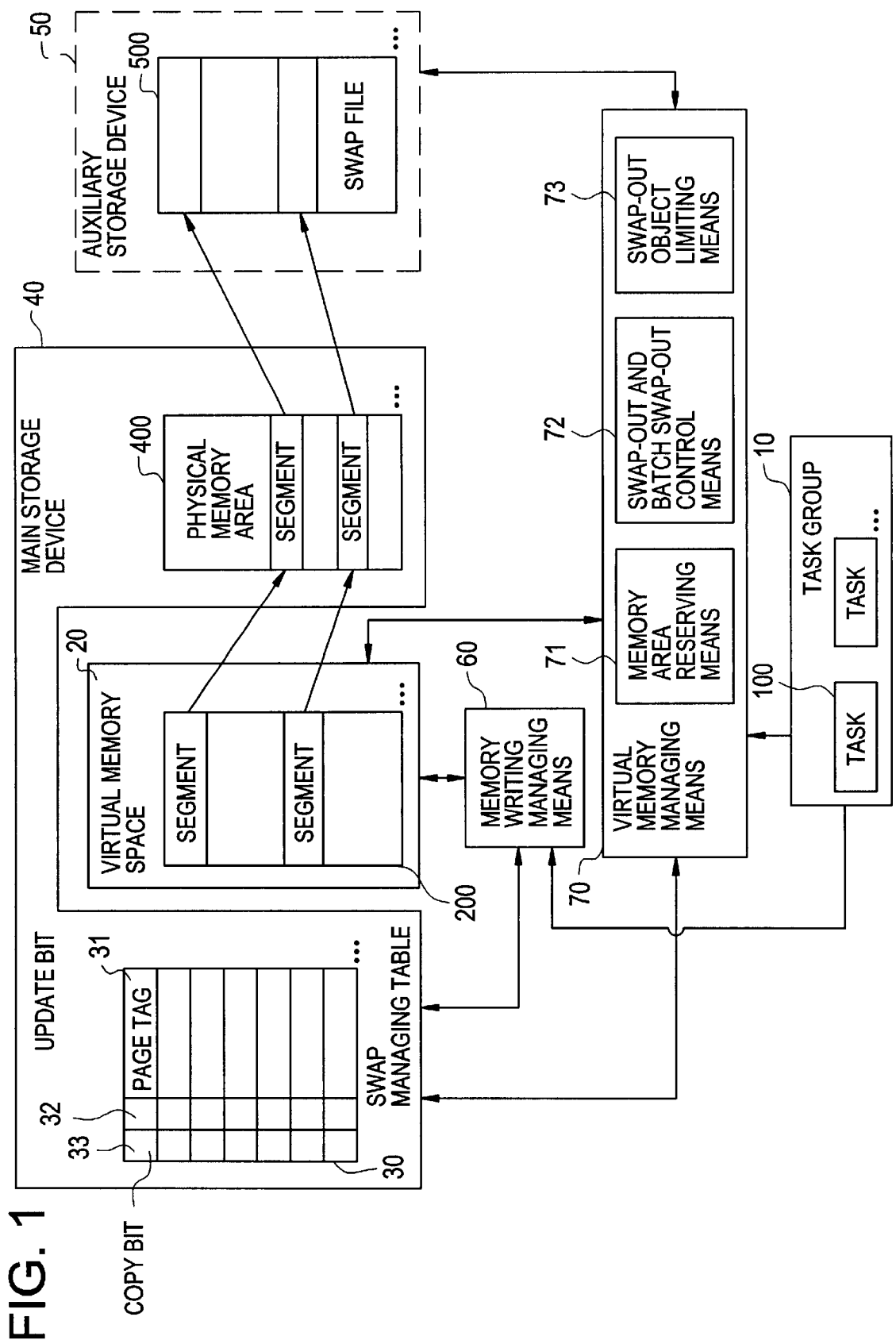
FIG. 1 is a block diagram showing the constitution of the virtual memory managing system according to the first embodiment of the present invention.

FIG. 1 is a block diagram showing the constitution of the virtual memory managing system according to the first embodiment of the present invention.

The virtual memory managing system according to the first embodiment of the present invention includes: task group 10 made up from one or more tasks (including task 100); virtual memory space 20 including one or more segments 200; one or more swap management tables 30 produced corresponding to memory area reserve requests from task group 10; main storage device 40 containing physical memory areas 400 corresponding to segments 200; auxiliary storage device 50 containing swap files 500 corresponding to segments 200 or physical memory areas 400 (files for storing in auxiliary storage device 50 the content (page data) of segments 200 (physical memory areas 400) by swap-out); memory writing managing means 60; and virtual memory managing means 70.

Swap management tables 30 are tables for managing information relating to swap-out for each page of segments 200 that is used by a task that issued a memory area reserve request. These swap management tables 30 hold, for each page: page tag 31 that stores a page address; update bit 32 containing update information of that page ("update" indicating that update has not been carried out, or "update completed" indicating that update has been carried out); and copy bit 33 containing information indicating whether or not a copy of that page is present in auxiliary storage device 50 ("copy completed" indicating that a copy exists, and "not copied" indicating that a copy does not exist).

Memory writing managing means 60 sets update bit 32 within swap management table 30 for that page to "update completed" when data (page data) within a page of segment 200 are updated.

Virtual memory managing means 70 manages swap management table 30, segment 200, physical memory areas 400, and swap files 500. This virtual memory managing means 70 includes memory area reserving means 71, swap-out and batch swap-out control means 72, and swap-out object limiting means 73.

Figure 2:
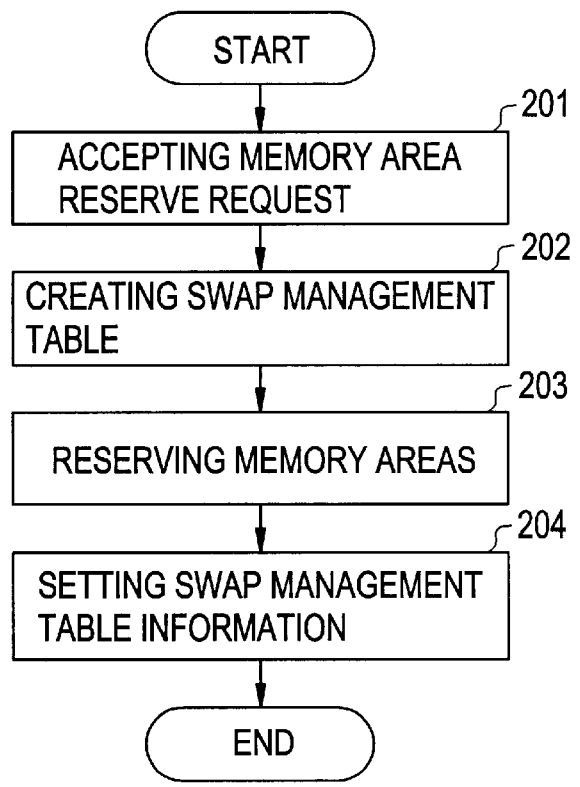
FIG. 2 is a flow chart showing the procedures at the time of a memory area reserve request in the virtual memory managing system shown in FIG. 1.

FIG. 2 is a flow chart showing the procedures at the time of a memory area reserve request in the virtual memory managing system according to this embodiment. These procedures include the steps of: accepting memory area reserve request 201; creating swap management table 202; reserving memory areas 203; and setting swap management table information 204.

Figure 3:
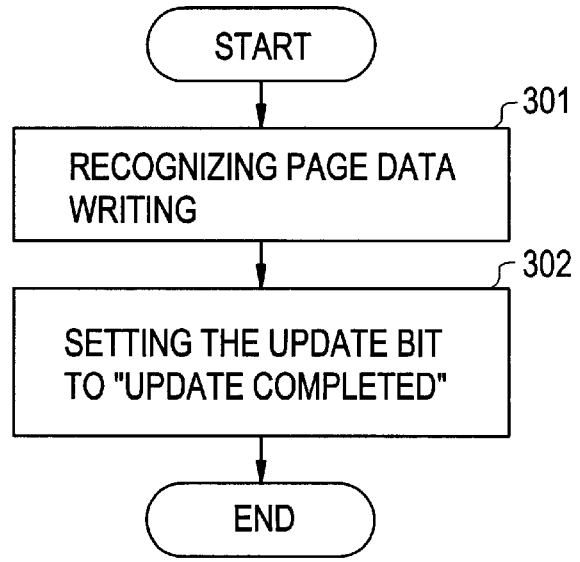
FIG. 3 is a flow chart showing the procedures at the time of writing page data in the virtual memory managing system shown in FIG. 1.

FIG. 3 is a flow chart showing the procedures at the time of writing page data of the virtual memory managing system according to the present embodiment. These procedures include the steps of: recognizing page data writing 301; and setting the update bit to "update completed" 302.

Figure 4:
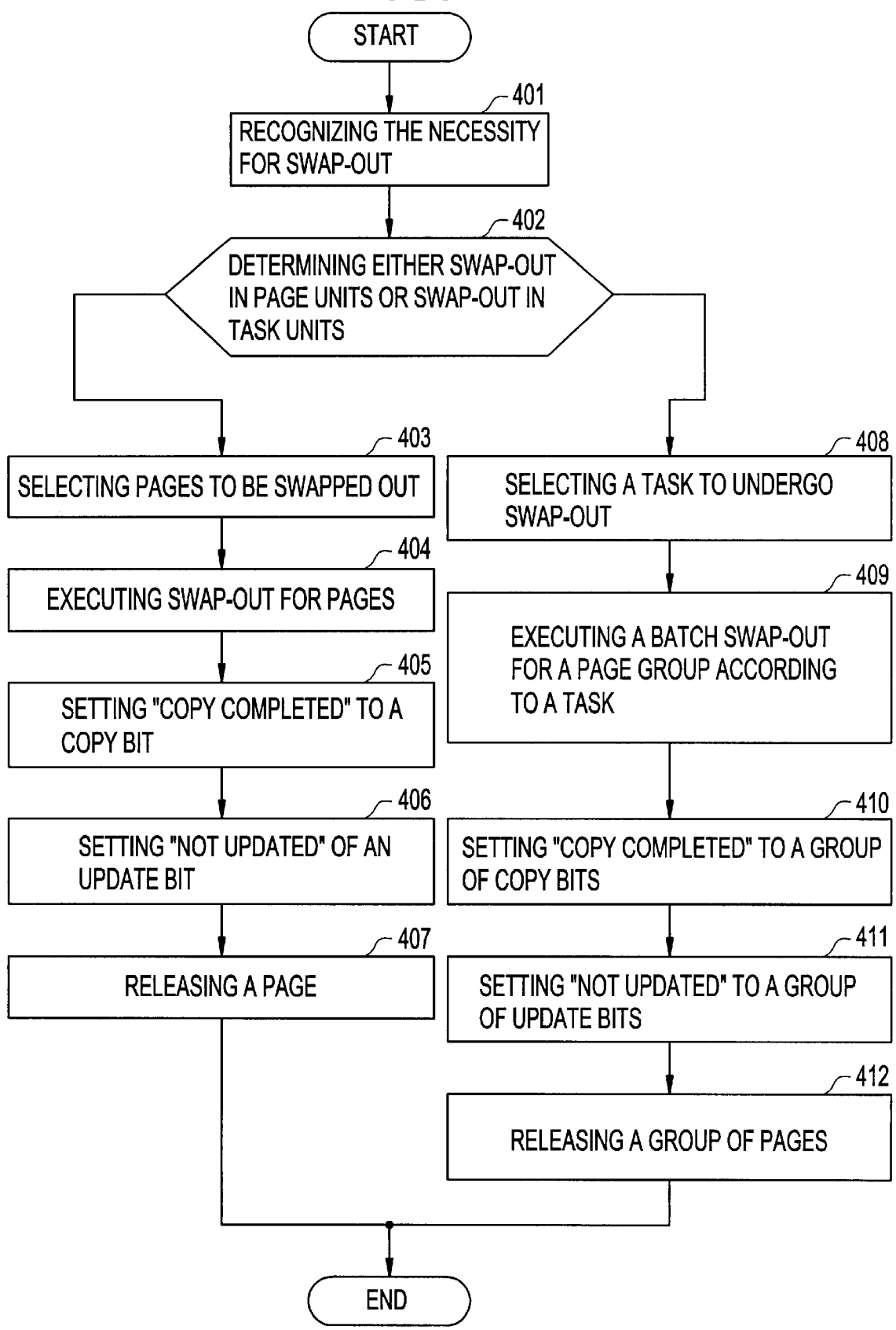
FIG. 4 is flow chart showing the procedures at the time of swapping out in the virtual memory managing system shown in FIG. 1.

FIG. 4 is a flow chart showing the procedures at the time of swap-out processing in the virtual memory managing system according to the present embodiment. These procedures include the steps of: recognizing the necessity for swap-out 401; determining either swap-out in page units or swap-out in task units 402; selecting pages to be swapped out 403; executing swap-out for pages 404; setting "copy completed" to a copy bit 405; setting "not updated" of an update bit 406; releasing a page 407; selecting a task to undergo swap-out 408; executing a batch swap-out for a page group according to a task 409; setting "copy completed" to a group of copy bits 410; setting "not updated" to a group of update bits 411; and releasing a group of pages 412.

A detailed explanation is next presented regarding the overall operation of the virtual memory managing system according to the present embodiment configured as described above.

The operation at the time of a memory area reserve request is first described (refer to FIG. 2). In other words, explanation is presented regarding the reserving of memory areas (physical memory areas 400 within main storage device 40, segments 200 in virtual memory space 20, and swap files 500 within auxiliary storage device 50) and the creation of swap management table 30 within main storage device 40 based on a new memory area reserve request.

Any task (taken as task 100) of task group 10 issues a memory area reserve request in the course of processing.

Memory area reserving means 71 in virtual memory managing means 70 accepts the memory area reserve request from task 100 (Step 201) and carries out processing as described hereinbelow.

First, memory area reserving means 71 produces swap management table 30 corresponding to that memory area reserve request (Step 202). In other words, memory area reserving means 71 creates swap management table 30 for managing the memory areas used by task 100 having the following items for each page: page tag 31, update bit 32, and copy bit 33.

Memory area reserving means 71 holds and manages information indicating the correspondence between swap management tables 30 and tasks (such as information indicating correspondence between identifying information of a particular task and a starting address of the relevant swap management table 30). By means of this type of management, memory area reserving means 71 is able to retrieve swap management table 30 for a specific task. If a plurality of memory area reserve requests are issued from the same task, memory area reserving means 71 responds by adding information relating to second and subsequent memory area reserve requests to swap management table 30 that was produced in accordance with the first memory area reserve request.

In addition, memory area reserving means 71, in response to a particular memory area reserve request, logically sets segments 200 in virtual memory space 20, reserves physical memory areas 400 in main storage device 40, and reserves swap files 500 in auxiliary storage device 50 (Step 203). If there are no vacant areas in main storage device 40 for reserving the above-described physical memory areas 400, a swap-out process described hereinbelow is carried out and vacant areas are reserved.

Memory area reserving means 71 next sets information in swap management table 30 created in Step 202 by means of the "reservation of memory areas" in Step 203 (Step 204). In other words, memory area reserving means 71 sets the page address of each page of the reserved segments 200 in page tags 31 in the entries corresponding to each of these pages. In addition, memory area reserving means 71 also sets "not updated" in update bit 32 for each page, and sets "not copied" in copy bit 33 for each page.

Explanation is next presented regarding the operations relating to the process of writing data for pages (refer to FIG. 3).

Any task (assumed here to be task 100) within task group 10 carries out the process of writing data as necessary with respect to specific pages of the memory areas that were reserved as described hereinabove. The operation of the virtual memory managing system according to the present embodiment is considered for a case in which this writing process is carried out.

In this case, memory writing managing means 60 recognizes that task 100 has carried out writing of data to the relevant pages of segment 200 (Step 301). Memory writing managing means 60 further sets "update completed" in update bit 32 of the entry in swap management table 30 corresponding to the relevant pages (Step 302).

The operation relating to swap-out processing is next explained (refer to FIG. 4).

When a memory area is reserved in accordance with a new memory area reserve request from any task of task group 10 (refer to the explanation of the operations at the time of a memory area reserve request above), swap-out becomes necessary if vacant areas of physical memory areas 400 do not exist for that memory area reserve request in main storage device 40. The operation of the virtual memory managing system according to the present embodiment is here considered for a case in which this type of swap-out becomes necessary.

In this case, swap-out and batch swap-out control means 72 of virtual memory managing means 70 first recognizes this need for swap-out (Step 401) and then determines whether swap-out should be carried out in page units or batch swap-out should be carried out in task units (Step 402). Here, "memory size of the memory area (requested size) that is requested in the memory area reserve request" is most commonly taken as the criterion of determination in this Step 402.

If swap-out and batch swap-out control means 72 determines in Step 402 that "swap-out should be carried out in page units" (for example, in a case in which the criterion of determination is the requested size and the requested size according to the memory area reserve request in question is equal to or less than a fixed reference value that is given in advance), swap-out control means 72 then selects the page to be swapped-out by a set algorithm (such as the LRU algorithm) (Step 403), and carries out swap-out for this page (stores the page data of the page in question in swap file 500 in auxiliary storage device 50)(Step 404).

When the copy of the page data was made to swap file 500 in auxiliary storage device 50 by the swap-out in page units described hereinabove, swap-out and batch swap-out control means 72 then sets "copy completed" to copy bit 33 of the entry corresponding to that page (the page subjected to swap-out) within swap management table 30 (Step 405), changes update bit 32 within that entry to "not updated" (Step 406), and releases that page (Step 407).

On the other hand, if swap-out and batch swap-out control means 72 determines in Step 402 that "swap-out should be carried out in task units" (for example, in a case in which the criterion of determination is the requested size and the requested size according to the memory area reserve request in question is greater than a fixed reference value), swap-out and batch swap-out control means 72 selects by a set algorithm the task that should undergo swap-out (Step 408), and carries out executing a batch swap-out for a page group according to a task (segment 200) relating to that task (stores the page data of that page group in swap file 500 within auxiliary storage device 50) (Step 409).

Swap-out and batch swap-out control means 72 further sets "copy completed" to the group of copy bits 33 within swap management table 30 corresponding to the page group that was subjected to the above-described swap-out in task units (Step 410), changes the group of update bits 32 within that swap management table 30 to "not updated" (Step 411), and releases that page group (Step 412).

Here, the "selection of task to be subjected to swap-out" in Step 408 is carried out by, for example, an averaged LRU algorithm for the page group (the used page group) that is used in each task. In other words, a method is adopted by which: an evaluation is carried out based on each LRU algorithm for all pages relating to each task; an average value of this evaluation relating to each page is found for each task; and the task for which it is determined by this average value that the "corresponding page group has gone unused the longest time" is selected as the "task to undergo swap-out."

In addition, by adding the physical memory size (the size of physic al memory area 400) that is currently used (occupied) by each task at this time to the selection criteria (the criteria for selecting a task to undergo swap-out), tasks can be selected such that those tasks that release the greatest amount of physical memory when swapped out are given priority.

When "swap-out in task units" is being carried out by swap-out and batch swap-out control means 72, swap-out object limiting means 73 effects control such that only pages corresponding to entries of swap management table 30 in which update bit 32 is "update completed" or pages corresponding to entries in which copy bit 33 is "not copied" are subjected to swap-out (i.e., control such that swap-out is not executed for pages that are copied but not updated). Since "pages that are copied but not updated" have already been recorded in swap file 500, it is preferable to avoid the pointless execution of swap-out of these pages.

Swap-out and batch swap-out control means 72 within virtual memory managing means 70 similarly repeats the swap-out process from Step 401 until the requested size according to the memory area reserve request from a task can be reserved.

The Second Embodiment

Figure 5:
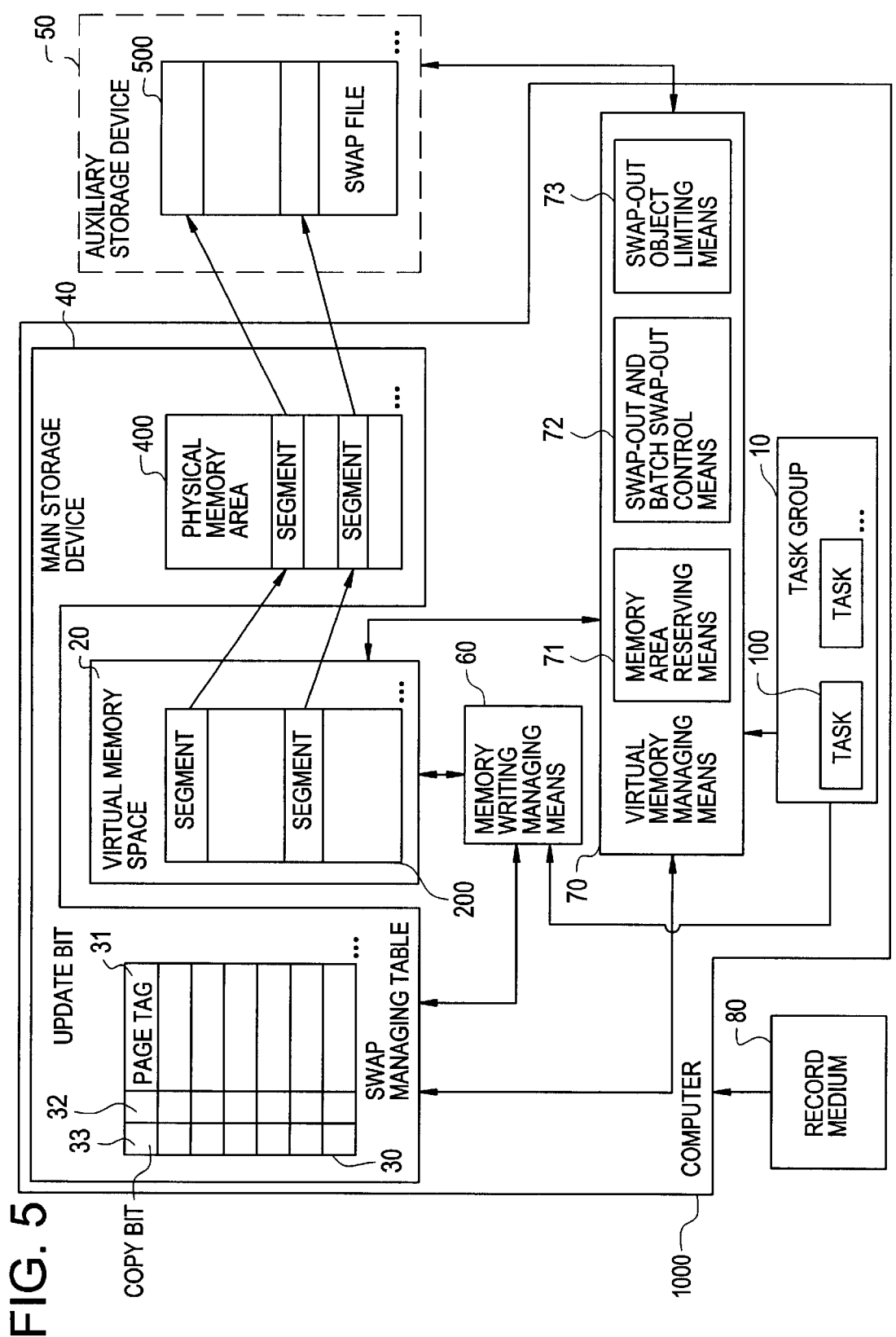
FIG. 5 is a block diagram showing the constitution of the virtual memory managing system according to the second embodiment of the present invention.

FIG. 5 is a block diagram showing the construction of the virtual memory managing system according to the second embodiment of the present invention.

Referring to FIG. 5, the virtual memory managing system according to the second embodiment of the present invention differs from the virtual memory managing system according to the first embodiment shown in FIG. 1 in that it is provided with record medium 80 on which is recorded a virtual memory managing program. This record medium 80 may be a magnetic disc, a semiconductor memory, or other record medium.

The virtual memory managing program is read from record medium 80 to computer 1000 (a computer that is connected to auxiliary storage device 50 having swap files 500, that includes main storage device 40 having swap management tables 30 and physical memory areas 400, that logically reserves virtual memory space 20 having segments 200, and in which task group 10 is executed); and controls the operation of this computer 1000 as memory writing managing means 60 and virtual memory managing means 70 (virtual memory managing means 70 that includes memory area reserving means 71, swap-out control means 72, and swap-out object limiting means 73). The operation of computer 1000 under the control of the virtual memory managing program is equivalent in every way to the operation of memory writing managing means 60 and virtual memory managing means 70 (memory area reserving means 71, swap-out control means 72, and swap-out object limiting means 73) in the first embodiment, and detailed explanation is therefore here omitted.

While preferred embodiments of the present invention have been described using specific terms, such description is for illustrative purposes only, and it is to be understood that changes and variations may be made without departing from the spirit or scope of the following claims.

What is claimed is:

1. A virtual memory managing system comprising:

a main storage device including physical memory areas corresponding to a plurality of swap management tables that correspond to memory area reserve requests from a task group including a plurality of tasks and a virtual memory space containing a plurality of segments;

an auxiliary storage device containing swap files in which are stored data corresponding to said segments and said physical memory areas;

memory writing managing means for setting said swap management tables based on an update of said segments;

a virtual memory managing means including:

memory area reserving means for reserving said physical memory areas, said segments, and said swap files based on memory area reserve requests from tasks; and swap-out control means for determining whether swap-out should be carried out in page units or batch swap-out should be carried out in task units and, based on this determination, executing and controlling swap-out; and swap-out object limiting means, wherein swap-out is not carried out for pages that have been copied without being updated.

2. A virtual memory managing system according to claim 1 wherein said swap-out control means, when determining whether swap-out should be carried out in page units or batch swap-out should be carried out in task units:

carries out batch swap-out in task units if the size of a memory area requested in a memory area reserve request is larger than a reference value.

3. A virtual memory managing system according to claim 1 wherein said swap-out control means, when determining whether swap-out should be carried out in page units or batch swap-out should be carried out in task units:
  selects pages that are to be swapped out by an LRU algorithm if it is determined that swap-out should be carried out in page units; and
  selects a task that should be swapped out by an LRU algorithm that is averaged for group of used pages if it is determined that batch swap-out should be carried out in task units.

4. A virtual memory managing system according to claim 3 wherein said swap-out control means adds the size of physical memory that each task currently occupies to the criterion of selection of a task that is to undergo swap-out.

5. A virtual memory managing system comprising:
  swap management tables provided with items referred to as page tag, update bit, and copy bit for each page of a virtual memory space containing a plurality of segments;
  memory area reserving means for, based on a memory area reserve request from a task, creating and managing said swap management table that corresponds to that memory area reserve request; reserving, for that memory area reserve request, physical memory areas in a main storage device, segments in virtual memory space, and swap files in an auxiliary storage device; and setting information in said swap management table by means of the reservation of these memory areas;
  swap-out control means for, when swap-out becomes necessary, determining whether swap-out should be carried out in page units or batch swap-out should be carried out in task units; controlling and executing swap-out based on this determination; and setting information indicating that pages that are subject to swap-out have been copied to swap files in said auxiliary storage device in copy bits for these pages in said swap management table;
  memory writing managing means for, when data in said pages have been updated, setting information indicating update of these pages in update bits for these page in said swap management table; and
  swap-out object limiting means for effecting control such that, when batch swap-out is carried out in task units under the control of said swap-out control means, swap-out is not carried out for pages that have been copied without being updated based on update bits and copy bits in said swap management table.

6. A record medium on which programs are recorded, comprising:
  a program for causing a computer in a virtual memory managing system to function as a memory area reserving means that, based on a memory area reserve request from a task, reserves physical memory areas in a main storage device, segments in virtual memory space, and swap files in an auxiliary storage device;
  a program for causing said computer to function as a swap-out control means that, when swap-out becomes necessary, determines whether swap-out should be carried out in page units or batch swap-out should be carried out in task units, and then controls and executes swap-out based on this determination; and
  swap-out object limiting means, wherein swap-out is not carried out for pages that have been copied without being updated.

7. A record medium on which programs are recorded, comprising:
  a program for causing a computer in a virtual memory system to function as a memory area reserving means that, based on a memory area reserve request from a task, creates and manages a swap management table that is provided with items referred to as page tag, update bit, and copy bit; reserves, for that memory area reserve request, physical memory areas in a main storage device, segments in virtual memory space, and swap files in an auxiliary storage device; and sets information in said swap management table that reflects the reservation of these memory areas;
  a program for causing said computer to function as swap-out control means that, when swap-out becomes necessary, determines whether swap-out should be carried out in page units or batch swap-out should be carried out in task units; controls and executes swap-out based on this determination; and sets information indicating that pages that are subject to swap-out have been copied to swap files in said auxiliary storage device in copy bits for these pages in said swap management table;
  a program for causing said computer to function as memory writing managing means that, when data in pages have been updated, sets information indicating update of these pages in update bits for these pages in said swap management table; and
  a program for causing said computer to function as swap-out object limiting means that effects control such that, when batch swap-out is carried out in task units under the control of said swap-out control means, swap-out is not carried out for pages that have been copied without being updated based on update bits and copy bits in said swap management tables.

* * * * *